2 Sheets—Sheet 1

D. W. NORRIS.

Incased Glass-Vessel.

No. 8,324. Reissued July 9, 1878.

*Witnesses*

Harry King

Wm Blackstock.

*Inventor.*

Daniel W. Norris,

By L. Hill,

His Atty.

2 Sheets—Sheet 2.
D. W. NORRIS.
Incased Glass-Vessel.
No. 8,324. Reissued July 9, 1878.
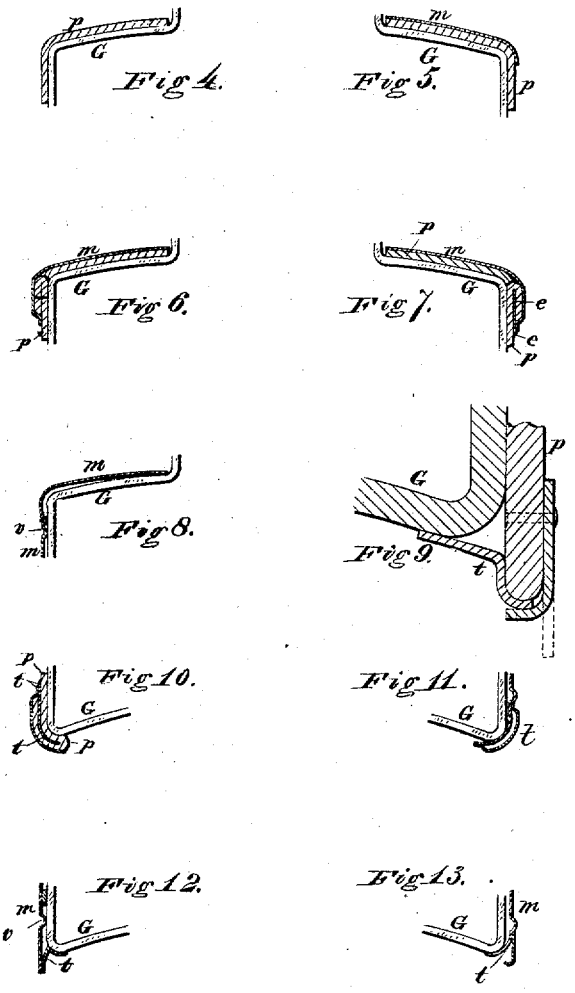
*Witnesses.*
Harry King
Wm. Blackstock.
*Inventor.*
Daniel W. Norris.
By L. Hill
His Atty.

UNITED STATES PATENT OFFICE

DANIEL W. NORRIS, OF ELGIN, ILLINOIS.

IMPROVEMENT IN INCASED GLASS VESSELS.

Specification forming part of Letters Patent No. 195,385, dated September 18, 1877; Reissue No. 8,324, dated July 9, 1878; application filed June 17, 1878.

*To all whom it may concern:*

Be it known that I, DANIEL W. NORRIS, of Elgin, in the county of Kane and State of Illinois, have invented a new and Improved Incased Glass Vessel for Oils, Chemicals, &c.; and I do hereby declare the following to be a full, clear, and exact description of the same, reference being had to the accompanying drawings, forming part of this specification, in which—

Figure 1:
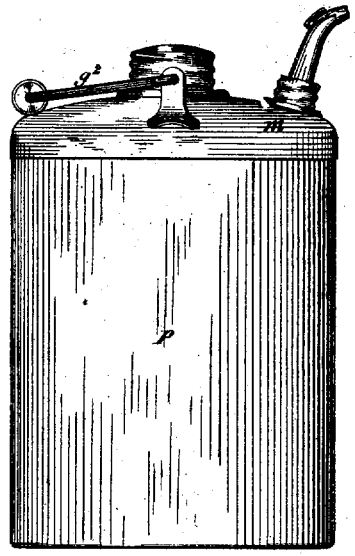
Figure 2:
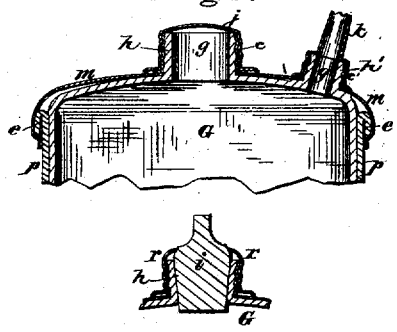

Figure 1 is a side view; Fig. 2, a vertical section of the upper part of the vessel; Fig. 3, a vertical section through the stopper; Figs. 4 to 8, inclusive, sections showing the application of the casing to the top of the vessel; and Figs. 9 to 13, inclusive, sections showing the application of the casing to the lower part of the vessel.

Similar letters of reference in the accompanying drawings denote the same parts.

This invention relates to improvements in incased glass demijohns, bottles, jars, cans, and other similar vessels of glass; and it consists in certain novel features, which will be hereinafter more fully specified, and pointed out particularly in the claims.

I have deemed it necessary to show in the drawings only one form of vessel with my improvements applied, since any skilled mechanic having seen their application to this form can readily apply them to other forms.

The vessel which I have selected for illustration is represented in Figs. 1 and 2, and consists of a glass can, G, provided with an aperture, *g*, for filling, and a discharge-orifice, $g^1$, and having a bail, $g^2$, attached to the cover or casing by any suitable means.

I incase the walls and top of the vessel with either paper, *p*, or metal, *m*, or both, extending down under the edges of the bottom, so as to form a support, upon which the can rests, but leaving the central part of the bottom uncovered, for the purpose of enabling the contents to be readily seen by lifting the vessel. In some cases it may be best to cover the sides with paper and the top with metal, or vice versa, or to cover either sides or top, or both, with a casing of paper surrounded by an outer casing of metal; or both the sides and the top may be covered with either paper or metal alone. Several of these combinations are shown in Figs. 2 and 4 to 13, inclusive.

I prefer to construct the supporting metal rim under the vessel in such manner that it shall possess a certain degree of elasticity proportioned to the weight or fragility of the vessel, in order to save the latter from violent concussion when dropped upon an unyielding surface. Several modifications for this purpose are shown in Figs. 9 to 13, inclusive.

I do not limit myself to the details of construction shown in the drawings, but will proceed to describe them, in order to explain to mechanics skilled in the art some of the various modes in which the casing may be constructed and applied for practical use.

In Fig. 2 a paper or paper-board casing is applied to the sides of the vessel, and is combined with the sheet-metal covering applied to the top. The connection between the two is effected by having the upper edge of the paper turned down upon a sheet-metal hoop, *e*, to which the lower edge of the top casing is fitted and soldered or otherwise fastened.

Fig. 7 shows substantially the same construction, except that a pad of paper is applied between the glass and the top covering.

In Fig. 6 the same pad is applied under the top covering; but in connecting the sheet-metal top cover to the paper side case the band or hoop E is omitted, and the two casings are simply riveted together.

In Figs. 4 and 5 the paper side casing is molded or otherwise formed to fit also over the top of the can, so that the side and top casings are continuous, and in Fig. 5 a metal cap is represented as applied over the paper. Figs. 8, 11, and 13 show a jacket or casing in which sheet metal alone is used.

In Fig. 8 the sheet-metal side casing is represented as combined with a sheet-metal top casing, the two sheets being united along their edges by any suitable means, and being held away from the glass by means of internal ribs or corrugations formed in the sheet metal, as represented at *v*; and Fig. 12 shows the sheet-metal side casing as held away from the glass can by the interposition of some other material, and also shows the internal ribs or corrugations *v*, for the same purpose as in Fig. 8.

The bottom flange or tongue is represented by *t* in Figs. 9, 11, 12, and 13, and may consist of a supporting-lip turned in under the can, combined with a downwardly-projecting angle, as shown in Figs. 9 and 12, united by any suitable means with the lower edge of the side casing, or with an independent rim or band, as seen in Fig. 9.

When the paper side casing is used, the flange or tongue rests against the inner side of the paper, and is held in place by the independent rim or band, which is placed outside of the paper, extending below the same, and folding under both the paper side casing and the flange, to both of which it is attached by any suitable means, as seen in Fig. 9; or the paper may be doubled back at the bottom and a piece of metal be applied outside and riveted or otherwise secured to the paper casing, as shown in Fig. 10.

In both instances the outside bearing-surface is of metal, and the comparatively rigid metal is so combined with the more yielding paper that a sufficiently elastic support is provided for the can.

The same result can measurably be attained even if the lower edge of the paper or metal side casing extends down only to the connection shown in Fig. 9, and the supporting rim or band be formed to extend from that point downward below the edge of the glass vessel, and then be bent up into contact with the inner flange or tongue, so as to leave an open space immediately under the edge of the vessel, in which case the elasticity of the metal rim and flange alone will answer the purpose.

The filling-orifice *g* and discharge-orifice $g^1$ are formed in glass necks *h h'*, and are made independent of each other, in order that either may answer as an air-vent while the other is employed for its legitimate purpose. Both glass necks are peripherally covered with closely-fitting sheet-metal collars *c c'*, which are permanently attached to the metal or paper top casing of the vessel by solder or otherwise, in order to prevent any liquid from working under the casing. A packing or cement may be interposed between the metallic collars and the glass neck to render this result more certain.

The collars on the glass necks serve to lock the top casing down to the glass vessel, and thus assist in supporting the vessel when raised by the bail, thereby to that extent relieving the side casing from undue strain.

The filling-orifice *g* is covered with a removable screw-cap, *j'*, of sheet metal, and the discharge-orifice $g^1$ is provided with a projecting spout, *k*, which is soldered to an external collar, *c'*, permanently attached to the neck *h'*, and extended above and inwardly over the top of the latter, as shown.

When the vessel is to contain acids or other corrosive or volatile liquids, a ground-glass stopper may be applied, as represented at *i*, Fig. 3, and may be held securely in its place by an outside ring of metal, *r*, screwing down over the glass collar, and provided with a retaining-flange at its upper edge, which locks over the shoulder of the glass stopper and prevents the latter from working out.

Some of the advantages of this mode of incasing glass vessels are that it adds only slightly to the weight and size of the vessel, is inexpensive, is neat in appearance, and perfectly incases and protects the vessel at all essential points, so as to prevent injury from contact with other objects, and obviates the leakage common to vessels in which the same orifice is used for both filling and pouring, and renders the vessel more convenient to pour from, as it can be emptied by tipping it but little more than one-half over, while it does not prevent the condition of the interior or of the contents from being inspected at pleasure.

The mode of constructing the case so as to cover the sides and top, but leave the bottom exposed, is of great value when the vessel is to contain substances that are chemically affected by light, inasmuch as it protects the vessel from the access of the light-rays, and yet does not hinder a free inspection of its contents, the only space that is capable of transmitting light being closed by setting the vessel on its bottom, and exposed by raising it therefrom for the purpose of examining its contents.

Having thus described my invention, what I claim as new is—

1. An incased glass vessel for containing and transporting liquids, having an elastic metallic rim extending under the edges of the bottom, for the purpose of furnishing a support for the vessel without excluding light through the bottom when the incased vessel is raised, substantially as described.

2. The combination of a glass vessel, paper side case, and metal top covering, substantially as described.

3. In combination with an incased glass vessel, a glass neck or collar around the supply or discharge orifice, having external screw-threads, a metal covering around the periphery of the collar, and having screw-threads, and a screw cap, ring, or nozzle adapted to overlapping the metal covering, substantially as described.

4. In an incased glass vessel, the combination of the lifting bail or handle and the inclosing-case with a screw-neck and a cap or ring screwing or otherwise secured around said screw-neck, and lapping over the top covering, whereby in lifting the vessel the whole or a portion of the weight is supported by the screw-neck, substantially as described.

5. An incased glass vessel provided with one or more glass supply and discharge necks, having external metal coverings screwing or otherwise secured around said neck or necks and attached to the top covering, in combination with a lifting bail or handle, whereby in carrying the vessel the whole or a portion of the weight is supported by the glass neck or necks, substantially as described.

6. An incased glass vessel having a glass discharge-neck, a metallic collar permanently attached to the periphery of said neck, and also to the casing, and having a pouring-spout permanently attached to said peripheral collar, substantially as described.

DANIEL W. NORRIS.

Witnesses:
M. CHURCH,
N. E. WOODS.